United States Patent [19]

Kim

[11] Patent Number: 5,485,307

[45] Date of Patent: Jan. 16, 1996

[54] BINOCULARS

[75] Inventor: Byung-Sun Kim, Borken, Germany

[73] Assignee: Bresser Optik GmbH & Co. KG, Borken, Germany

[21] Appl. No.: 191,062

[22] Filed: Feb. 2, 1994

Related U.S. Application Data

[63] Continuation of Ser. No. 927,911, Aug. 7, 1992, abandoned.

[30] Foreign Application Priority Data

Aug. 9, 1991 [DE] Germany ............... 41 26 288
Nov. 12, 1991 [EP] European Pat. Off. ........... 91119224.3

[51] Int. Cl.$^6$ .................................................. G02B 23/00
[52] U.S. Cl. .................... 359/421; 359/418; 359/827; 359/828; 359/643
[58] Field of Search ................................. 359/418, 409, 359/421, 643–647, 828, 827, 418

[56] References Cited

U.S. PATENT DOCUMENTS

| 169,917 | 11/1875 | Nystrom | 359/643 |
| 409,927 | 1/1889 | Clements | 359/421 |
| 841,262 | 1/1907 | Martin | 359/421 |
| 967,143 | 8/1910 | Arriaga | 359/646 |
| 1,553,211 | 9/1925 | Barr et al. | 359/421 |
| 5,000,556 | 3/1991 | Katsuma | 359/421 |
| 5,299,067 | 3/1994 | Kutz et al. | 359/827 |

FOREIGN PATENT DOCUMENTS

| 23977 | 5/1977 | Japan | 359/643 |
| 16125 | of 1906 | United Kingdom | 359/421 |
| 504032 | 4/1939 | United Kingdom | 359/421 |

*Primary Examiner*—Loha Ben
*Assistant Examiner*—Suma N. Ramaswamy
*Attorney, Agent, or Firm*—Kinney & Lange

[57] ABSTRACT

A binocular includes an eye-piece tube, a first lens system associated with the eye-piece tube for providing a base magnification as seen through the eye-piece tube, and an eye-piece module having a second lens system therein which is interchangeably installed in the eye piece tube for changing the position of the first lens system to a position of a preset increase in magnification.

9 Claims, 4 Drawing Sheets

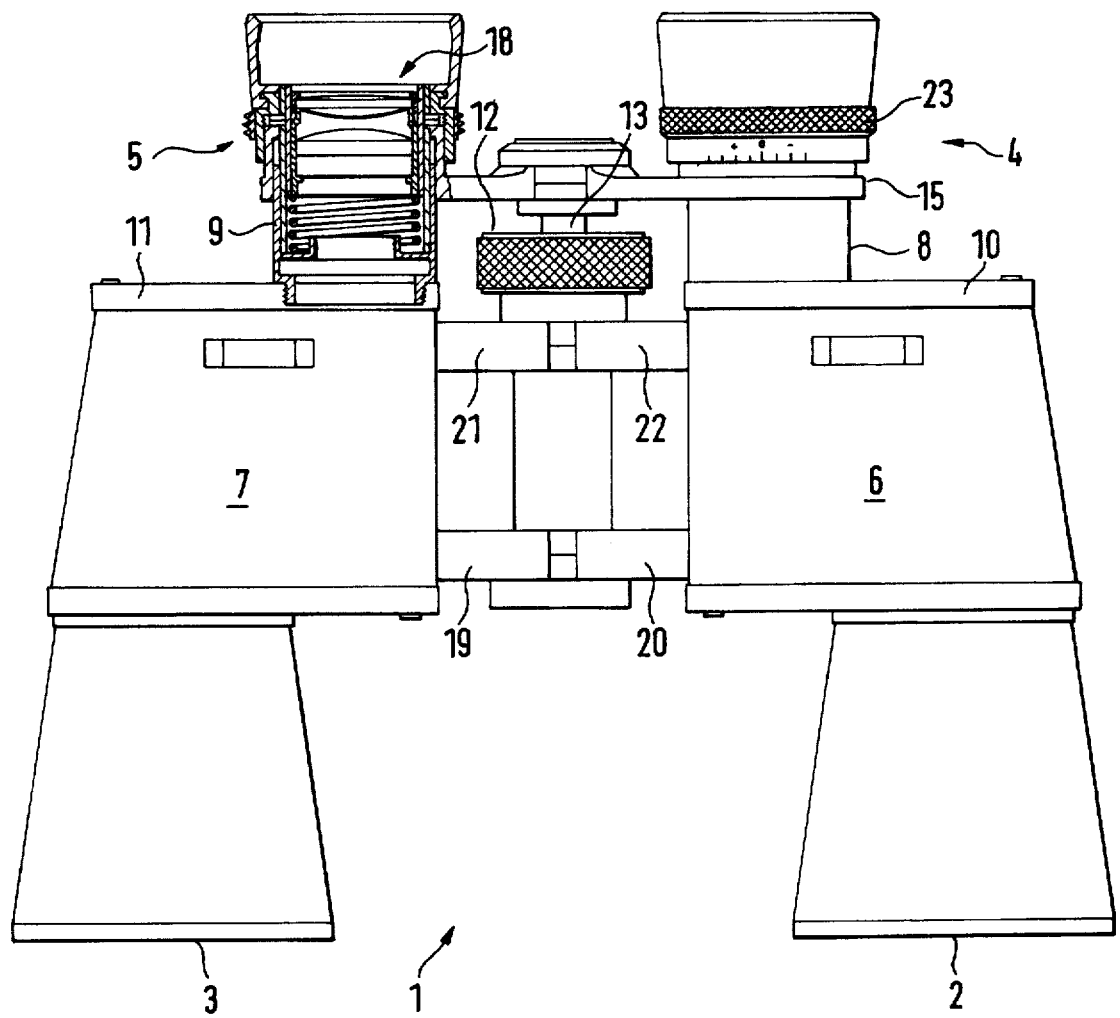

FIG.3a   FIG.3b   FIG.3c
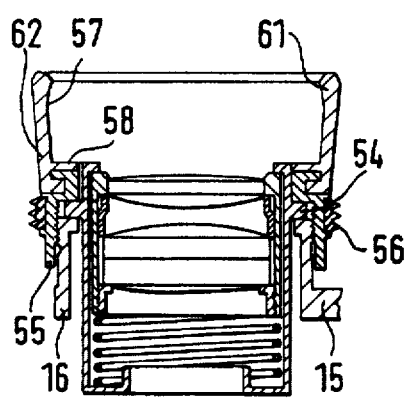
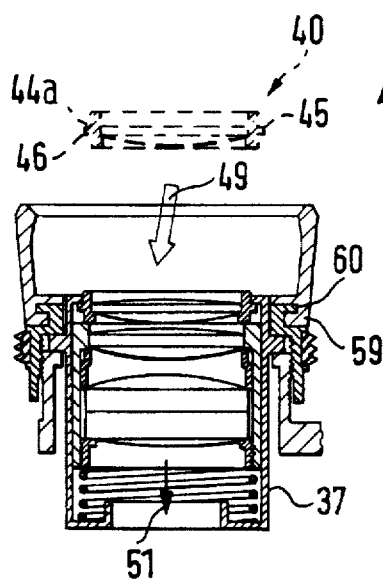
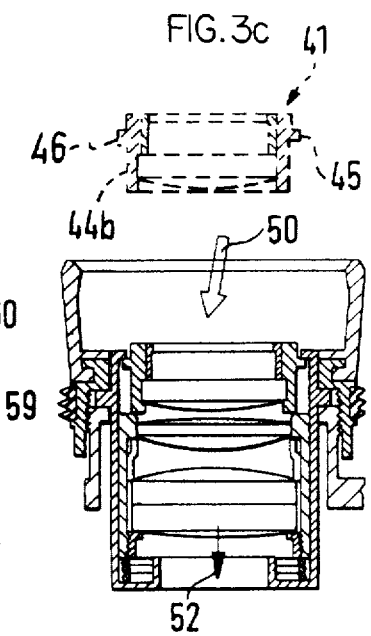
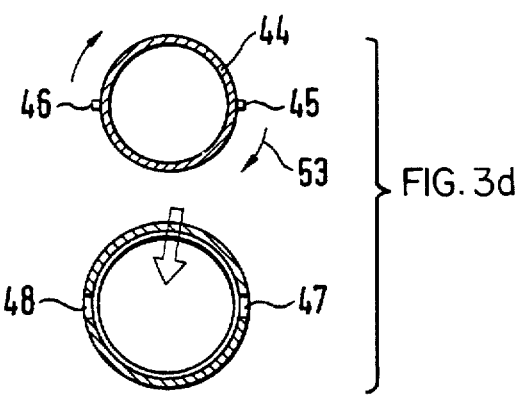
FIG.3d

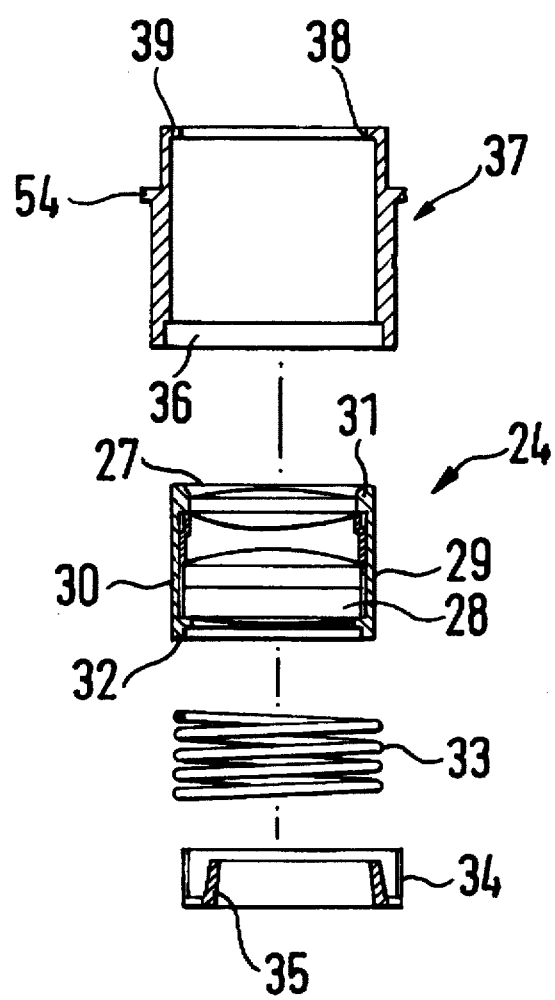
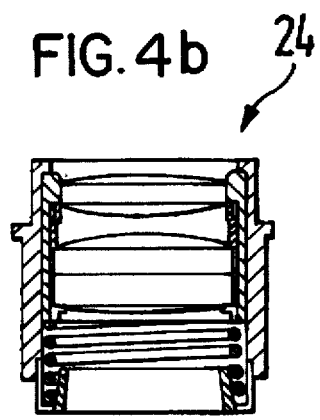

BINOCULARS

This is a continuation of application Ser. No. 07/927911, filed Aug. 7, 1992, now abandoned.

BACKGROUND OF THE INVENTION

The invention concerns a binocular telescope, especially a prism binocular.

Prism binoculars differ from terrestrial binoculars in their shorter construction. The binocular, in accordance with the invention, also shows the known assemblies. These include, among others, a focus adjustment which, as an example, may be embodied as an example in the form of a central drive to adjust both eye-piece lens slides or also diopter focusing mounts. The binocular in accordance with the invention shows, preferentially, both devices which has the advantage that spectacle wearers who do not wear their spectacles while using the binocular can dispense with their spectacles with the aid of the diopter focusing mount.

Such binoculars have, in their known designs, a predetermined magnification which is often six, seven, eight or ten times. The user adjusts such a binocular taking into account its depth of field to a specific large distance, which, for example, is 150 m. He then moves the diopter adjusting mount until he obtains a sharp image. By turning the central drive, he can reach all focus areas without the use of spectacles. However, he cannot change the magnification with such binoculars.

There are, any event, also known binoculars of the appropriate type which permit the user to change magnification. These include a design which, through the turning of a revolving head bearing different eyepieces, turns the two eye-piece lenses of the binoculars and therefore changes the magnification. Since the entire lens system of each eye-piece must be changed, this results in a substantial technical expense for the optics of the binoculars. Further, there arise unusual shapes different form customary design, which are often found to be bothersome.

Another possibility of the optional change in magnification by the user is offered by so-call zoom binoculars. In this case, the eye-piece system consists of several lenses and a handle with which a lens or a pair of lenses can be adjusted in the lens system, as a result of which the magnification of the binoculars is changed. In general, however, the quality of the image is deteriorated if it is compared with the binoculars indicated above which have a fixed magnification.

The invention is based on the problem of producing a pair of binoculars which provides the user with the possibility of choosing the magnification of the binoculars without difficulty, and without a design which is different from the customary design, or which substantially deteriorates the image quality.

SUMMARY OF THE INVENTION

The present invention relates to a binocular, especially a prism binocular, which has a variable magnification as a result of influencing its eye pieces. The invention is characterized in that a fixed magnification is provided as the base magnification with the lens system of the eye pieces. Eye piece modules are used to influence the eye pieces. Each module consists of a lens system whose bodies are to be inserted interchangeably from outside and which simultaneously adjust the position of the eye piece lens system to a preset depth in the eye piece tube, determined by the increased magnification.

In accordance with the invention, the binoculars are chosen with a fixed basic magnification which offers the possibilities to the user as previously described. Through the eye-piece module, without replacing the eye-piece system or changing it by adjusting individual or multiple lenses, the desired increase in magnification as compared to the base magnification of the binoculars is reached. These eye-piece modules are inserted in the appropriate eye-piece type of the eye-piece extension as a result of which the lens system of the eye-pieces are moved in the binoculars. This takes place in such a manner that the entire eye-piece lens system is brought into an exact, pre-selected position so that the exact positioning of the eye-piece system in combination with the eye-piece module chosen provides the higher magnification assigned to it.

The invention has the advantage that the user acquires a marketable binocular with fixed, that is to say pre-set, magnification, and by purchasing one or more additional pairs of eye-piece modules, can increase its magnification step by step. The binocular can be used and adjusted, even with increased magnification, conventionally, as described above. It can have the customary design. Since the eye-piece modules are interchangeable, the user can at any time return from a higher magnification to a different magnification, including the base magnification, by removing the module installed. The quality of the image in all cases remains substantially unchanged.

A bi-convex lens or an achromat in the lens system having an axial lens corresponding to the position of the eye-piece system assigned to the eye pieces module makes possible the above-described increase in magnification of the binocular in multiple stages and are therefore especially suitable for users who make such demands of the binocular.

An elastic support of the eye-piece lens system in the tube as the advantage that the positions provided for the eye-piece lens system for the different magnifications can be exactly assumed without the user having to pay special attention to it. That is, when he inserts a given eye-piece module, he pushes the eye-piece lens system a distance determined by the length of the module into the eye-piece tube because the spring holds are two lens systems together even when the bayonet closure is engaged. If this is disengaged again, then the spring pushes the module outward again and ejects it so that the original position of the eye-piece lens system is automatically reestablished.

The use of the coil spring makes it possible to bring the elastic support outside the light path, without necessitating noticeable changes in the design of the binocular, or making it necessary to accept deterioration of the image quality. In this embodiment, of the eye-piece module, but also to guide them, resulting in a jam-proof motion of the lens systems which is guaranteed in all changes of magnification.

BRIEF DESCRIPTION OF THE DRAWINGS

The details, further characteristics and other advantages of the invention are shown in the following description of an embodiment based on the figures in the drawing wherein:

FIGS. 2a, 2b and 2c are a binocular in accordance with the invention in a view with two eye-piece modules represented outside the binocular;

FIGS. 3a–3d are the three magnifications of the binocular in FIGS. 2a–2c where the insertion of the eye-piece module is reflected; and FIGS. 4a and 4b are the design of an eye-piece lens system which is used in the embodiments according to FIGS. 2a–2c and 3a–3c, in accordance with the invention.

DETAILED DESCRIPTION OF THE PREFERRED EMBODIMENTS

Figure 1A:
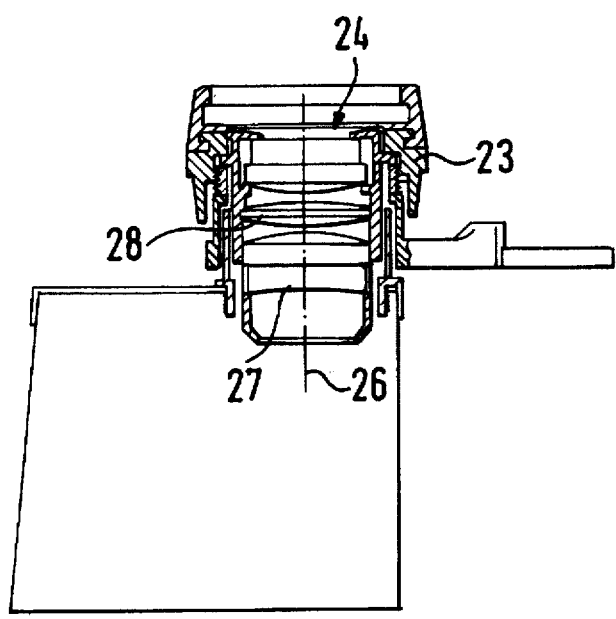
FIGS. 1a–1c are three cross-sectional representations of different eye-piece systems for various base magnifications which are fixed.

As shown in the representation of FIGS. 2a–2c, the binocular (1) in accordance with the invention, is a prism binocular in which the distance of the two objections (2, 3) is greater than the distance of the two eye-pieces (4, 5). The two prism housings (6, 7) have on their end plates (10, 11) the eye-piece guide tubes (8, 9) which are fastened to it. On the optical center line is a central drive (12) which, through a spindle (13) and an eye-piece bridge (15), with an aid of tube-shaped sockets (16) (FIG. 3) working on a pari or tubes (17) which accepts the eye-piece lens system (18). The two prism housings (6, 7) are connected to each other by an angled bridge, whose hinged bands (19–22) are also connected to each other with a moveable joint along the optical central line.

With the aid of a diopter ring (23), the focus for each eyepiece can be set.

Figure 1B:
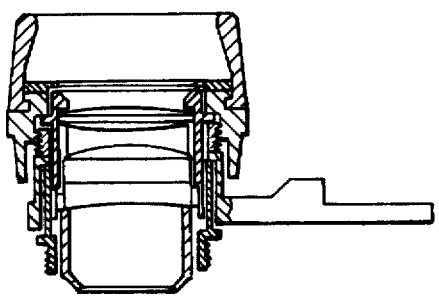
Figure 1C:
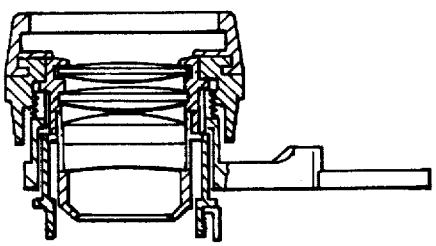

In the representation of FIGS. 2a–2c it is assumed that the binocular represented (1) provides a seven-times magnification which is fixed. In the representation of FIGS. 1a–1c, the seven-times magnification eye-piece lens system is represented in comparison with the lens system which provides a magnification of ten or twelve times. In all cases, these are fixed magnifications which are used as basis magnification in the binocular (1) in accordance with the invention.

In the case of twelve-times magnification, the focus point of a lens combination (24) in the optical axis (26) of the total system is adjusted with the aid of the diopter ring (23). In this connection, the achromat (27), unlike the customary lens system, is moved upward and field lens (28) is moved upward. This arrangement is present in the binocular in accordance with the invention in all magnifications which otherwise differ form each other only in the type of the moveable lenses. The binocular therefore has a high eye-piece focus point.

The eye-piece lens system in the base model of the binocular (1) with seven-times magnification is shown in FIGS. 4a and 4b, both assembled and in exploded view. According to it, the lens system (24) is inserted into an eye-piece tube (37). The lenses (27 and 28) are solidly mounted inside a carrier consisting of a segment of pipe and are spaced by means of a cylindrical spacer (30). The two end flanges (31, 32) serve to support the ends of a coil spring (33) for which the support ring (34) is provided, which has a recessed flange (35) to seat against the lower end of the coil spring. The support ring (34) sits in the milled-in slot (36) of the eye-piece tube (37). This tube has an upper connecting flange (38) on which the upper flange (31) of the 2pipe segment rests when the parts are assembled in accordance with FIG. 4b. In this case, the piper segment (29) and therefore the eye-piece lens system, rests on the coil spring (33) and is pressed by it against the inner ring surface (29) of the flange (38) on the tube (37). On the other hand, pressure on the system (24) can tension the spring (33) and therefore press the system (24) downward in the tube.

In the position of the eye-piece system which can be taken from FIG. 3b, FIG. 1b and repetition of FIGS. 2a–2c, seven-times magnification is adjusted which the user cannot simply change because it is determined by the factory.

However, the user is supplied eye-piece modules (40 and 41) which fit the binocular (1). The sample embodiment shows two eye-piece modules with which, in accordance with FIGS. 3a–3c, the magnification of the binocular (1) can be changed from the seven-times magnification to ten-times or twelve-times magnification. The module (4) for the ten-times magnification has a bi-convex lens (42) while the module (41) has an achromat (43).

Common to the modules (40 and 41) are rings (44a, 44b) which encloses the lenses of the lens module (40, 41). This ring has radial pins (45, 46) which pass through grooves (47, 48) of the tube flange (38). As is recognizable from the example of FIGS. 3c and 3d, the modules (40 and 41) may be inserted from above in to the tube (37) provided that the pins (45, 46) are inserted into the grooves (47, 48) in the flange (38) See FIG. 3d). This is shown by the arrows (49 and 50). Upon insertion of the pins (45, 46) in the grooves (47, 48), the entire lens system (24) of the eye-piece is pressed axially, that is, in the direction of the arrows (51, 52) downward, and the coil spring (33) is further tensioned. The measurement of the movement of the system (24) is given by the axial length of the rings (44a, 44b), which is therefore different.

After the pins (45, 46) have passed through the slots to the bottom, with a slight turn in the direction of the arrows (53) in FIG. 3d, the module in question (40 or 41) can be locked in place. The lens system of the module and of the eye-piece are therefore fixed at the predetermined distances.

By reversing the procedure, the modules (40 and 41) may be removed from the tubes. Then the system (24) is automatically returned to its original position by the coil spring (33).

It is understood that the arrangement shown in the figures for the left eye-piece (5) is also provide for the right eye-piece.

In the assembly of the parts, the eye-piece tube is placed under tension with its central ring flange (54) between the pipe spacer (16) and a profiled adjusting ring, which can be turned in an outside thread of the pipe spacer with an inside thread. The profiled adjusting ring has an outside, preferably knurled, rubber rung (56) which makes the diopter adjustment possible. The upper end of the shaped ring (55) carries the eye-piece cup (57), is supported with an inner flange (58) on the profiled adjusting ring, and is held by an :internal flange (59) in a annular slot (60) of the profiled adjusting ring. The upper thickened end (61) of the eye-piece cup can be swung outward and lies on the lower section (62) from outside so that the tube flange is more easily accessible. The binocular can therefore be used with or without eye-piece cups.

Although the present invention has been described with reference to preferred embodiments, workers skilled in the art will recognize that changes may be made in form and detail without departing from the spirit and scope of the invention.

What is claimed is:

1. A binocular comprising:

an eye-piece tube;

a first lens system associated with the eye-piece tube for providing a base magnification as seen through the eye-piece tube; and an eye-piece module having a second lens system therein which is interchangeably installed in the eye piece tube for changing the position of the first lens system to a position of a preset increase in magnification.

2. The binocular of claim 1, wherein the second lens system includes at least a bioconvex lens.

3. The binocular of claim 1, wherein the second lens system includes an achromat.

4. The binocular of claim 1, wherein the first eye-piece lens system is fastened elastically in the eye piece tube adjacent a tube end, and wherein the eye-piece module includes a bayonet fastening for locking and unlocking the eye-piece module in the eye-piece tube.

5. The binocular of claim 4, wherein the eye-piece tube includes a ring, and wherein the elastic support of the first lens system includes a coil spring which is supported by the ring.

6. The binocular of claim 4, wherein the second lens system includes a lens holder, and wherein the bayonet fastener includes radial pins projecting from an exterior surface of the lens holder and gaps in an upper end flange of the eye-piece tube corresponding to the pins, wherein the coil spring holds or ejects the eye-piece module by turning of the bayonet fastener.

7. The binocular of claim 1, wherein the eye-piece tube is held with an outer ring addition and a profiled adjusting ring which serves for diopter adjustment.

8. The binocular of claim 7, wherein the diopter adjustment ring bears a shaped outside ring as a handle, and an eye-piece cup which is held by an internal flange supported against a front side of the profiled adjusting ring and in an outer slot of the profiled adjusting ring.

9. The binocular of claim 1, wherein the first lens system further includes an achromat and a field lens arranged in an optical axis.

* * * * *

UNITED STATES PATENT AND TRADEMARK OFFICE
CERTIFICATE OF CORRECTION

PATENT NO.   : 5,485,307
DATED        : January 16, 1996
INVENTOR(S)  : Byung-Sun Kim It is certified that error appears in the above-indentified patent and that said Letters Patent is hereby corrected as shown below:

Column 3, line 57, delete "2", before "pipe"--.

Column 4, line 46, delete ":", before "internal"--.

Column 5, line 4, delete "bioconvex", insert --bi-convex--.

Signed and Sealed this

Fourth Day of June, 1996

Attest:

BRUCE LEHMAN

*Attesting Officer*        *Commissioner of Patents and Trademarks*